US008194102B2

(12) United States Patent
Cohen et al.

(10) Patent No.: US 8,194,102 B2
(45) Date of Patent: Jun. 5, 2012

(54) RENDERING ANNOTATIONS FOR IMAGES

(75) Inventors: Michael Cohen, Seattle, WA (US); Qing Luan, Beijing (CN); Steven Drucker, Bellevue, WA (US); Johannes Kopf, Redmond, WA (US); Ying-Qing Xu, Redmond, WA (US); Matthew T. Uyttendaele, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 797 days.

(21) Appl. No.: 12/245,771

(22) Filed: Oct. 6, 2008

(65) Prior Publication Data
US 2010/0085383 A1 Apr. 8, 2010

(51) Int. Cl.
G09G 5/02 (2006.01)
G06T 15/10 (2011.01)
G09G 5/00 (2006.01)
G10L 21/00 (2006.01)

(52) U.S. Cl. ......... 345/660; 345/427; 345/629; 704/270
(58) Field of Classification Search .................. 345/633, 345/660
See application file for complete search history.

(56) References Cited

U.S. PATENT DOCUMENTS

| 3,846,755 | A | * | 11/1974 | Hart .............................. 382/206 |
| 6,226,422 | B1 | | 5/2001 | Oliver |
| 6,236,395 | B1 | | 5/2001 | Sezan et al. |
| 6,549,922 | B1 | | 4/2003 | Srivastava et al. |
| 7,133,597 | B2 | | 11/2006 | Tingey et al. |
| 2003/0236582 | A1 | * | 12/2003 | Zamir et al. .................... 700/94 |
| 2005/0036667 | A1 | * | 2/2005 | So et al. ......................... 382/128 |
| 2006/0212794 | A1 | | 9/2006 | Evans et al. |
| 2007/0038458 | A1 | | 2/2007 | Park |
| 2007/0116456 | A1 | * | 5/2007 | Kuriakose et al. ............ 396/310 |
| 2008/0189173 | A1 | * | 8/2008 | Bakar et al. .................... 705/14 |
| 2008/0291201 | A1 | * | 11/2008 | Lafon ........................... 345/427 |

FOREIGN PATENT DOCUMENTS
EP 1126721 B1 4/2004

OTHER PUBLICATIONS

Noah Snavely, Steven M. Seitz, and Richard Szeliski, "Photo Tourism: Exploring Photo collections in 3D", Jul. 2006, ACM New York, Proceedings of ACM SIGGRAPH 2006, pp. 835-846.*
"Be Heard",Nov. 2001 http://www.smartcomputing.com/editorial/article.asp?article=articles/archive/l0711/40l11/40l11.asp&guid=.
"Camera World", Mar. 4, 2006 http://cameraworld.blogspot.com/2006_02_26_archive.html.
"HD View: Panoramas with a Purpose" http://research.microsoft.com/displayArticle.aspx?id=1879.

* cited by examiner

Primary Examiner — Kee M Tung
Assistant Examiner — Sing-Wai Wu

(57) ABSTRACT

Techniques are described for rendering annotations associated with an image. A view of an image maybe shown on a display, and different portions of the image are displayed and undisplayed in the view according to panning and/or zooming of the image within the view. The image may have annotations. An annotation may have a location in the image and may have associated renderable media. The location of the annotation relative to the view may change according to the panning and/or zooming. A strength of the annotation may be computed, the strength changing based the panning and/or zooming of the image. The media may be rendered according to the strength. Whether to render the media may be determined by comparing the strength to a threshold.

17 Claims, 5 Drawing Sheets

RENDERING ANNOTATIONS FOR IMAGES

BACKGROUND

Techniques related to rendering annotations of large images are discussed below. Very large images can contain billions of pixels. These large images, sometimes called gigapixel images, may be difficult to navigate and view with conventional technology. Specialized software has recently been developed to facilitate smooth and rapid panning and zooming of large images. With such software, typically only a small fraction of an image is viewable at one time. For example, when viewing a 5 gigapixel image on a 1 megapixel screen, only 1/5000th of the pixel data is viewed at one time.

To improve the experience of navigating a large image, annotations may be added and displayed as the image is navigated. Annotations are various forms of media such as text, sound, etc., that may be associated with some object in an image. Problems related to rendering annotations while navigating large images have not been addressed. For example, because there can be significant changes in scale when zooming in and out of a large image, simplistic rendering schemes can result in overly large or small text, sound played when the object associated with the sound is not in view. Other problems may occur. Described below are techniques related to creating and rendering annotations in a system for navigating images.

SUMMARY

The following summary is included only to introduce some concepts discussed in the Detailed Description below. This summary is not comprehensive and is not intended to delineate the scope of the claimed subject matter, which is set forth by the claims presented at the end.

Techniques are described for rendering annotations associated with an image. A view of an image may be shown on a display, and different portions of the image are displayed and undisplayed in the view according to panning and/or zooming of the image within the view. The image may have annotations. An annotation may have a location in the image and may have associated renderable media. The location of the annotation relative to the view may change according to the panning and/or zooming. A strength of the annotation may be computed, the strength changing based the panning and/or zooming of the image. The media may be rendered according to the strength. Whether to render the media may be determined by comparing the strength to a threshold.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Embodiments discussed below relate to rendering annotations in a system for navigating an image by zooming and/or panning the image. The embodiments are useful with very large images, on the order of billions of pixels, yet may be used with smaller images also. Because there may be extreme changes in zoom level and position of a window viewing a large image, annotations, for example text, can be difficult to render. For example, large changes in zoom level of a view can cause text annotations to disappear or to dominate the view. Audio annotations can be played when their subject is not shown or they may overlap. The embodiments described below model a navigation view or window relative to the image and its annotations. This model may emphasize or rely on different factors to determine how/whether to render annotations, including factors such as distances of annotations from the view window, the size of the view relative to the sizes of the annotations (e.g., sizes of areas in the image that represent the locations of the annotations), whether the image is zooming or not, or depth of an annotation relative to the view (if the image has a depth map), and others.

Figure 1:
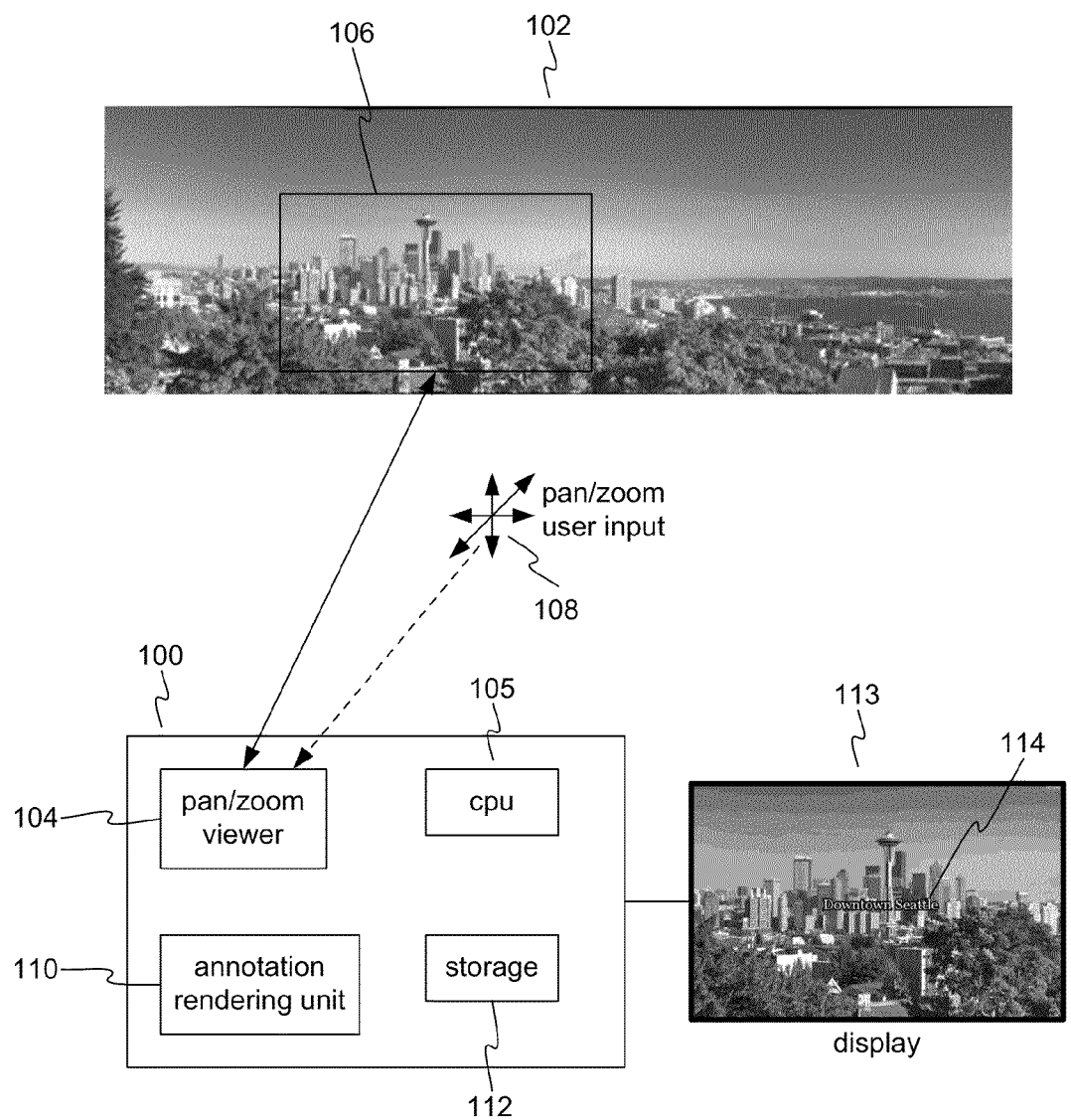
FIG. 1 shows a system for navigating an image.

FIG. 1 shows a system 100 for navigating an image 102. The image may be a very large image, possibly on the order of billions of pixels (a "gigapixel" image). A pan/zoom viewer 104 is provided to allow panning/zooming the image 102. Due to their size, gigapixel images may be stored or represented as a multi-resolution pyramid of small tiles that are downloaded and assembled on-the-fly by the viewer. See the "HD View", described elsewhere, for further details of systems for navigating large images. Such piecewise structuring of the image 102 may be helpful, but is not necessary; very large images may be stored and navigated locally as unitary bitmap images. Nonetheless, conceptually, image 102 may be structured as a grid of pixels in x×y where, depending on the projection (perspective, cylindrical, spherical) of the underlying image, there is a mapping from x and y to directions in space. Given a virtual camera, the pan/zoom viewer 104 may render view 106 (a projection of the virtual camera) depending on the current orientation, pan, and zoom parameters of the virtual camera. It should also be noted that image 102 may even be a rendering of a 3d model, a combination of a bitmaps and vector data, and so on. Ultimately, the techniques described herein may be used for any form of imagery, regardless of its source or how it is formed into displayable pixels. For example, the image 102 could be one of a series of images in an animation loop. Changing of the underlying image data 102 need not alter the decision making of the annotation rendering unit 110 and the pan/zoom viewer 104.

The pan/zoom viewer 104, in conjunction with CPU 105, may take user input 108 and pan/zoom the image 102 within the view window or view 106. As the image 102 is panned/zoomed, an annotation rendering unit 110 determines how and/or whether to render annotations stored in storage 112. In one embodiment, where annotations of the image have areas (e.g., rectangles of varying size) in the image, these areas change in size according to the zooming of the image (that is, as the image is enlarged or shrunk, areas in the image representing the annotations are correspondingly shrunk or enlarged). Storage 112 may also store software for an operating system, the pan/zoom viewer 104, the annotation rendering unit 110, etc. An annotation may be rendered either on display 113 or speakers. An annotation may be, for example, a text label 114 or an audio clip. Annotations will be described in further detail below.

Figure 2:
FIG. 2 shows different views of an image in accordance with navigation of the image and corresponding rendering of annotations by annotation a rendering unit.
Figure 2:
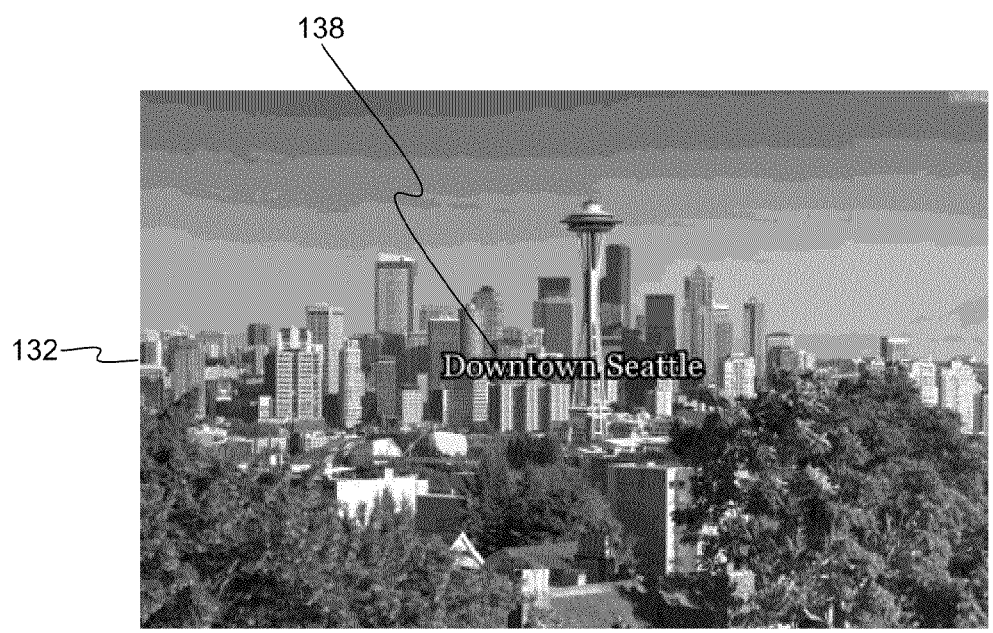

FIG. 2 shows different views 130, 132 of image 102 in accordance with navigation of the image 102 and corresponding rendering of annotations 134, 136, 138 by annotation rendering unit 110. Note that annotations can appear or disappear, change size, etc., according to the current view into the image 102. As will be described below, the annotation rendering unit 110 may determine, based on various factors, how and/or whether to render an annotation.

Figure 3:
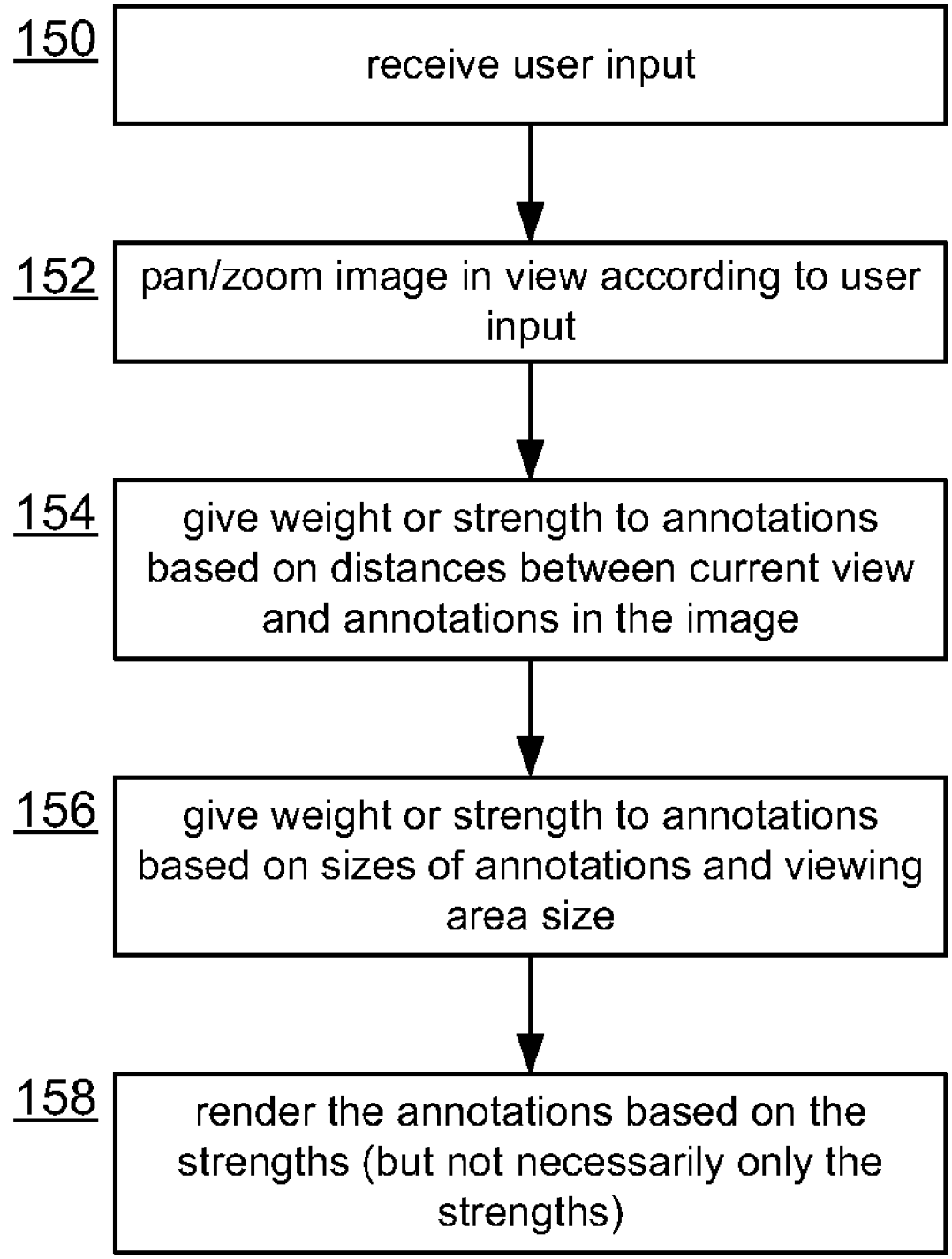
FIG. 3 shows a general process for rendering annotations.

FIG. 3 shows a general process for rendering annotations. User input (e.g., mouse drags, button presses, voice commands, or combinations thereof) is received 150. According to the use input, the image is panned/zoomed 152. That is, a different portion of the image is displayed in a viewing area or window. The new portion may have a smaller or larger scale (zoom level) and different portions of the image may be panned into and/or out of the viewing area. In one embodiment, the annotations may be given 154 respective strengths or weights based on distances between the current view and annotations in the image. Here, distance refers a distance, relative to the image (at its current zoom level), between the current viewing area (e.g., the center of the view window) and locations of the annotations in the image. Additionally (or in the alternative), annotations may be given 156 weights or strengths based on sizes of the annotations (e.g., how large an annotation is, per the current zoom level) and the viewing area size. Finally, the annotations are rendered 158 based on their respective computed strengths. The strengths may control the volume, brightness, size, and/or other aspects of the respective annotations.

Figure 4:
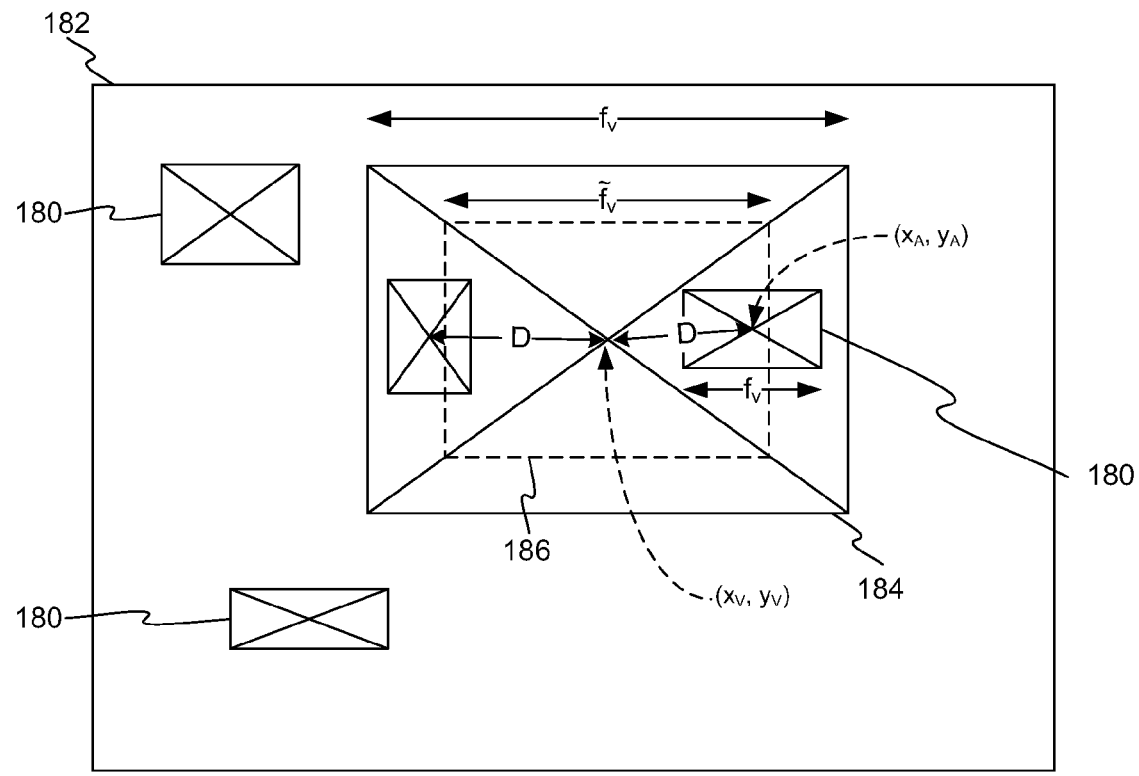
FIG. 4 shows example areas for annotations.

FIG. 4 shows example areas 180 for annotations. Given an image 182, a portion of which is shown in a view area or window 184. For the purpose of computing strengths of annotations, each annotation may have an area 180 that represents the annotation in the image 182. An annotation's area is in effect statically tacked to the image 182, such that when the image is enlarged or shrunk, the annotation area also is enlarged or shrunk, relative to the view area or window 184. Note that an area 180 may have any shape. However, if the shape of an annotation area 180 is a rectangle, then the annotation may be deemed to have a location in the image 182 at the center $(X_A, Y_A)$ of an annotation area. The center may be used to compute distances between annotations or distances D between annotations and the view 184 (which may have a designated location at its center $(X_V, Y_V)$). An annotation's location is not overly important and might be a corner of an annotation area 180, a center of mass, or even a random point outside an area 180. Similarly, the location of the view 184 can be anywhere relative to the view area or window 184 (e.g., a corner, a point outside the view, etc.). As will be described later, the size of the view area or window 184 used to compute annotation strengths can be either the view area or window 184 itself or an area of focus or perceived field of view 186 (discussed below) somewhat coincident with the view 184 but changing in size dynamically as the image 182 is zoomed and/or panned.

Figure 5:
FIG. 5 shows a depth map corresponding to an image.
Figure 5:
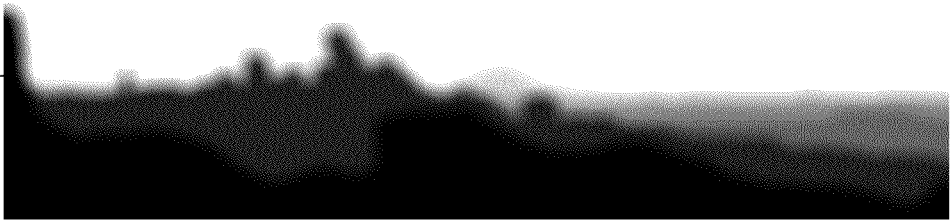

FIG. 5 shows a depth map 200 corresponding to an image 202. As will be described later, a depth map such as example depth map 200 can be used to supplement the computation of strengths of annotations. A depth map adds a depth dimension to an image by defining relative depths of pixels in the image. A depth map need not be precise and may be derived by automated image analysis, hand "painting" of depth fields (see the different colors in depth map 200), or data captured when the image was captured.

Returning to rendering of annotations, annotations of an image may reference objects within the image. For example, in an image of a cityscape, an annotation may refer to a region of the city, a building, or a single person on the street that cannot be seen due to its small size when the image is fully zoomed out. Thus, just as a view (e.g., image navigation window) has a position and an extent in the image defined by the zoom level, so does an annotation. In one embodiment, Annotations may be added and specified from within an interactive viewer while panning and zooming. A user may draw a rectangle or some other shape or area in the current view. The area may be intended to indicate the extent of the object being annotated. An annotation's location or position, $(X_A, Y_A)$ may be set as the center of the rectangle. An annotation's field of view, $f_A$ is set by the size of the annotation's area, for example, in the case of a rectangle, $f_A$=square_root($p(x_{right}-x_{left})\cdot(y_{top}-y_{bottom})$) of the annotation rectangle. Thus an annotation can be said to be located at $(X_A, Y_A, f_A, d_A)$ where $dA=d(X_A, Y_A)$ (see FIG. 4). Note that $d(X_A, Y_A)$ is the depth of a pixel at location $X_A, Y_A$, according to a depth map.

Regarding the renderable content of annotations, an annotation's content or media can be any of a variety of types such as text labels, audio loops, narrative audio, icons, short animations, hyperlinks, links to images, etc. Text label annotations may contain a text string as well as an offset within the annotation's area or rectangle and possibly also a leader line to guide final rendering. The position or layout of a displayable annotation may be computed dynamically to avoid crowding of text labels. Such automatic layout may be performed in conjunction with or separately from the techniques described herein for rendering annotations.

To compute strengths of annotations, the relevant elements may be mathematically modeled. To specify a view, given some pan and/or zoom state of an image, the center of the view has some coordinate $(X_V, Y_V)$ and some field of view $f_V$ (see FIG. 4) relative to the full image that defines the x and y extents of the view. When the image is fully zoomed out and visible then $f_v=1$, and when the image is zoomed in so that half of the width of the full image is within the browser frame then $f_v=0.5$. Thus, at any zoom level $f_v=x_{right}-x_{left}$ of the current view, where the left edge of the image is defined as x=0 and the right edge as having x=1. In an embodiment where a depth map is used, a depth of the view may be set to the value of the depth map at the center of the screen; $d_v=d(X_V, Y_V)$, where d(x,y) is the depth map. As described later, this depth value may become more significant as the image is zoomed in. The location or viewpoint of the view, preferably the center of the view, may be fixed relative to the display or viewing window.

To account for perceptual affects of rapid panning and zooming, the view may instead be specified as a perceived field of view 186 ($\tilde{f}_V$ in FIG. 4; a virtual or constructed view area that can change in size independent of the actual view area). As a user rapidly pans and zooms an image, users may become more aware of larger objects and when stopped on a particular view the user may become more aware of smaller objects. These perceptual effects may be captured by establishing a perceived field of view value $\tilde{f}_V$ that grows with motion of the view and shrinks when the view is still. This may be implemented as follows. A field of view multiplier, $m_f$, is initialized at time=0 to be 1.0, that is, $m_f(0)=1.0$. At each time step, this multiplier is increased if the view is changing and decreased if the view is static.

More formally, a variable m(t) is an indicator of motion. If there has been any panning or zooming motion of the view between time interval t−1 and time t then $m(t)=c_f$. If the view is still, then $m(t)=1/c_f$, where $c_f$ is a parameter that controls the strength of the maximum and minimum values the multiplier converges to. Reasonable results are obtained by setting $c_f$ to 1.5. This value can also be designed to vary based on motion speed. Thus, at each time step: $m_f(t)=m(t)+(1-\beta)m_f(t-1)$, and finally: $\tilde{f}_V=m_f f_V$, where β controls how fast the motion effect varies. A value of approximately 1.0 over the frame rate works well, or approximately 0.03. Thus, as $m_f$ varies between $c_f$ and $1/c_f$, the effective zoom grows and shrinks accordingly. In one embodiment, a view may be fully specified by its position, perceptual size, and the depth value at its center. This is captured by the tuple $(x_v, y_v, \tilde{f}_v, d_v)$, represented as perceived field of view 186 shown in FIG. 4.

Given a framework as described above for modeling annotations and a zoomable/pannable view, strengths of annotations can be computed based on a variety of factors. It should be appreciated that a strength or weight is a convenient way to represent, combine, and use these factors. As such, strength values per se are not needed and a variety of techniques may be used to inform rendering of annotations based on panning and zooming conditions. For example, any of the factors such as annotation-view distances or sizes of annotations relative to the view may be computed and used directly. In an embodiment where annotation strengths are computed, given a current view, an image, a set of annotations, and a view history, the annotation rendering system determines which annotations to render (whether they be visual or audio), what strength each should have (e.g., how loud, how large, how transparent, etc.), and/or where to place the annotation (label position or spatialized stereo). In one embodiment, the strength of each annotation is inversely correlated to the distance between the current view and the annotation. In other embodiments, the strength of each annotation may be correlated to other factors such as the size of an annotation's area relative to the view (or perceived field of view), varying combinations of distance and size, etc.

In one embodiment, the strength of an annotation may be computed by first computing the following four values relating to distance between the view and the annotation. $Xdist=|x_A-x_V|$ describes the horizontal offset between the view and the annotation. $Ydist=|y_A-y_V|$ describes the vertical offset between the view and the annotation. $Fdist=|\tilde{f}_V-f_A|/\tilde{f}_V$, if $\tilde{f}_V > f_A$ (while zooming in to the field of view of the annotation), and $Fdist=|\tilde{f}_V-f_A|/(1-\tilde{f}_V)$ otherwise (i.e., when we are zooming in beyond the field of view of the annotation). Fdist measures how large the object being annotated is relative to the view, and Fdist approaches zero when the object would fill the screen. In an embodiment where a depth map is used, $Ddist=c_d|d_A-d_V|\cdot(1-\tilde{f}_V)$, thus as the view is zoomed in, (i.e., $\tilde{f}_V$ gets smaller), the differences in depths takes on an increasing role. Compared to a wide field of view, a narrow field of view invokes a stronger sensation of being at the depth of the object. The term $c_d$ normalizes the depth difference term, typically set to $1/(d_{max}-d_{min})$. Finally, distance $D=\text{square\_root}(Xdist^2+Ydist^2+Fdist^2+Ddist^2)$. It should be noted that other measures of distance may be used. For example, Manhattan distance, cosine distance, or other measures may be used, so long as the function varies in proportion to navigational changes of location of an annotation relative to the view.

In an embodiment where strength values are used, the strength of an annotation may be initialized. The initial strength, A, of each annotation drops off with distance: $A=\exp(-D/\sigma_D)$, where $\sigma_D$ controls the drop off of the annotations with distance. A default value of $\sigma_D=0.1$ has been found through experimentation to work well. However, $\sigma_D$ is a parameter well suited to being controlled by a user. By varying $\sigma_D$ from small values to large, the user can control whether annotations in the immediate central view (i.e., having small D values) carry any strength, or with larger $\sigma_D$, all annotations carry more even strength.

In one embodiment, ambient annotations may be provided. An ambient annotation is an annotation intended to be rendered regardless of the current view state. These annotations are global and carry a constant weight, $A_0$, which may be set to 0.2. An ambient audio annotation provides background audio. In the case of text, an ambient label annotation may be a null annotation. Ambient audio volume and the influence of the null text annotation may diminish as other annotations gain strength (if normalization is used).

To maintain an approximate constancy of annotations their strengths may be normalized relative to the total of the strengths including the ambient term:

$$\overline{A}_i = A_i \Big/ \sum_i A_i.$$

This normalization may be done separately for the set of audio annotations and the set of visual annotations such as text annotations.

In another embodiment, it may be desirable to smooth the changes in rendering of annotations that result from panning/zooming an image. That is, it is possible to prevent sudden changes in how/whether annotations are rendered by using some hysteresis techniques. A hysteresis effect can be added to the strengths associated with each annotation by setting, for some time t:

$$\tilde{A}(t)=\alpha_+\overline{A}(t)+(1-\alpha_+)\tilde{A}(t-1)$$

for rising strengths, and by setting $$\tilde{A}(t)=\alpha_-\overline{A}(t)+(1-\alpha_-)\tilde{A}(t-1)$$

for falling strengths, so that the final strength of each annotation varies slowly. In practice, $\alpha_+$ may be set to 0.2, and $\alpha_-$ may be set to 0.05. The final strength A will lie in the interval [0, 1].

Rendering of annotations will now be discussed. Given strength $\tilde{A}$ for each annotation, annotations can be rendered accordingly. The panorama is rendered by the image viewer, for example using DirectX within an internet browser. Text labels may be drawn in the overlay plane. Audio loop (ambient) annotations may be rendered with volume directly correlated with the strength $\tilde{A}$. The left and right channels may be modulated to provide stereo directionality. Signed versions of Xdist and Ddist: $Xdist_{signed}=x_A-x_V$, and $DdiSt_{signed}=\text{Sign}(d_A-d_V)(c_d|d_A-d_V|)$, provide the angle $\text{atan}(Xdist_{signed}/Ddist_{signed})$ between the view direction and the annotation center which determines the relative left and right volumes.

Regarding audio narrative annotations, this type of annotation is intended to be played linearly from the start onward. To enable sensible interruption/resumption in accordance with zooming/panning, two strength thresholds may be set. One threshold specifies when a narrative annotation should be triggered to start. In one embodiment, when triggered, the narrative begins at full or artificially-forced high volume. At a lower strength threshold, the narrative begins to fade in volume over time (e.g., 3 seconds) until it is inaudible. If the user navigates the view back towards the narrative source (annotation) while it is still playing the narrative continues and regains volume. Once it has stopped, however, the narrative will not begin again until some interval (currently set to 20 seconds) has passed. As in the case of looping audio annotations (non-narrative), the narrative may also be modulated in stereo. Finally, in one embodiment, if one narrative is playing, other narratives are prevented from being played.

Regarding rendering of text labels, appearance and disappearance of text labels can also triggered by thresholds. As with narrative annotations, text annotations may be triggered to fade in over one second at a given strength value. They may be triggered to fade over one second at a somewhat lower threshold.

Text size may also be adjusted based on zooming. A balance may be reached between the following two problematic methods of setting text size. One possible method is to set text size to a fixed screen size, another is to set text size to a fixed size in the panorama coordinates. In the former case, even though the true size does not change (relative to the display and view), there is an optical illusion where text will appear to shrink as the image is zoomed, because the context is growing around the text. In the latter case of fixing the text size to the image, the text will be too small to read when zoomed out and will appear to grow and seem enormous when zoomed in; large changes in scale are common when zooming in and out of a very large image. A balance may be reached where text appears or is perceived to stay a static size during zooming in or during zooming out. This may be achieved by setting text size to increase in size (relative to the display) during zooming in at a rate slower than the zooming of the image, and by setting the text size to decrease (relative to the display) in size during zooming out at a rate slower than the zooming out of the image. That is to say, when zooming in, text may increase in size but less rapidly than the increasing magnified size of the image, and when zooming out, text size may decrease in size but less rapidly than the decreasing magnification of the image. To reach this result, a reasonable balance can be achieved by setting TextSize=$c_{text}(\gamma+(1-\gamma)Z_A/Z_V)$, with default $c_{text}$=16 point and $\gamma$=0.5. This results in a perceptually uniform text size during zooming even though the text in fact grows (relative to the view/display) as a user zooms in and shrinks (relative to the view/display) as the user zooms out.

For embodiments described above, a variety of parameters may be set by educated intuition and by simple experimentation; little trial and error is needed. The parameter values provided herein were used for actual testing. The ambient and hysteresis parameters are somewhat a matter of personal preference; smaller values lead to more responsive but jumpier behavior.

Embodiments and features discussed above can be realized in the form of information stored in volatile or non-volatile computer or device readable media. This is deemed to include at least media such as optical storage (e.g., CD-ROM), magnetic media, flash ROM, or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as RAM and/or virtual memory storing information such as CPU instructions during execution of a program carrying out an embodiment, as well as non-volatile media storing information that allows a program or executable to be loaded and executed. The embodiments and featured can be performed on any type of computing device, including portable devices, workstations, servers, mobile wireless devices, and so on.

The invention claimed is:

1. A method for rendering annotations associated with an image while panning and zooming the image in a view, the method comprising:

displaying on a display the view of the image, different portions of the image being displayed and undisplayed in the view according to panning and/or zooming of the image within the view, the image having an annotation having a location in the image and comprising associated renderable media, wherein the location of the annotation relative to the view changes according to the panning and/or zooming;

computing a strength of the annotation that changes based on the panning and/or zooming of the image; and rendering the media when the strength is above a threshold and not rendering the media when the strength is below the threshold, the rendering comprising either playing the media as sound or displaying the media on the display, wherein the renderable media comprises text having a changeable size relative to the view and the display and as the image is zoomed in the size increases relative to the view and the display and at the same time decreases relative to the zooming-in image.

2. A method according to claim 1, wherein the strength is computed based on a distance between the location of the annotation in the image and a location of the view relative to the image, the distance changing as the image is panned and/or zoomed, and the strength changing with the changing distance.

3. A method according to claim 1, wherein the annotation further comprises an area of the image corresponding to the location of the annotation in the image, wherein the strength is computed based on the size of the annotation, which changes with the panning and/or zooming of the image.

4. A method according to claim 1, wherein the view comprises a window.

5. A method according to claim 4, wherein there are a plurality of annotations, each comprising a location in the image and corresponding media, and wherein strengths of the annotations are normalized before they are used to determine how to render the corresponding media.

6. One or more physical non-signal computer readable storage media storing information to enable a computing device to perform a process, the process comprising:

providing a view window of an image and panning and zooming the image in the view window, different portions of the image being displayed in the view window in accordance with the panning and zooming;

maintaining annotations of the image, each annotation comprising an area with a location in the image and media elements to be played as audio of the view window, wherein the distances of the locations of the areas from the viewing window changing in accordance with the panning and zooming of the image in the view window; and determining how and/or whether the media elements of the annotations are to be played as audio of the view window in accordance with the changing distances of the locations of the areas from the view window such that annotations are played differently as the image is panned and/or zoomed, wherein according to the panning and zooming the sizes of the areas change relative to the view window, wherein the determining is also in accordance with the sizes of the areas relative to the size of the view window, wherein the size of the view window comprises a computed size that can differ from the actual display size of the view window, and wherein the size of the view window increases during panning and/or zooming and decreases when panning and/or zooming stops.

7. One or more computer readable media according to claim 6, wherein one of the media elements comprises an audio clip and when the determining stops playing of the audio clip before it completes, then when it is further determined to again play the audio clip, the audio clip is resumed where it previously stopped if the audio clip has been stopped for less than a threshold period of time and the audio clip is started from its beginning if the audio clip has been stopped for more than the threshold period of time.

8. One or more computer readable media according to claim 6, wherein at least one additional media element comprises text and when zooming out from the image the size of the text as displayed in the view window decreases relative to the view window and at the same time the size of the text increases relative to the zooming-out image.

9. One or more computer readable media according to claim 8, wherein during the zooming out the text shrinks at a rate slower than the image shrinks.

10. One or more computer readable media according to claim 6, wherein the locations of the areas are points of the respective areas, and wherein the distance of a location from the view window is measured from a point of the view window to the point of the area corresponding to the location.

11. One or more computer readable media according to claim 6, wherein the image further comprises a depth map defining depths of pixels in the image, and wherein the determining is further in accordance with depth differences between the view window and the areas.

12. A computing device including a CPU and storage, the computing device comprising:
   a pan/zoom unit that receives input and pans and zooms an image and areas of the image in a view in accordance with the input, the areas have respective sizes and locations that are static relative to the image and the areas pan and zoom with the image according to the pans and zooms of the pan/zoom unit such that the sizes and locations change relative to the view;
   a storage unit storing annotations of the image, each annotation represented by a respective one of the areas at a location in the image and text to be rendered, wherein when zooming out from the image the size of the text as displayed in the view decreases relative to the view and at the same time the size of the text increases relative to the zooming-out image; and
   an annotation rendering unit that renders text of annotations based on the changing sizes of the areas relative to a size of the view.

13. A computing device according to claim 12, wherein the size of the view used as a basis for the rendering changes dynamically based on panning and/or zooming of the image.

14. A computing device according to claim 13, wherein a window displays the view in a viewable area having a fixed display size, and the size of the view becomes larger and smaller relative to the fixed display size when the image is panning and/or zooming.

15. A computing device according to claim 12, wherein the annotation rendering unit renders the sound and/or text based also on distances of the areas to the view such that the rendering changes as the distances change, the distances changing according to the panning and zooming.

16. A computing device according to claim 12, wherein the image has a corresponding depth map defining depths of pixels in the image, and the annotation rendering unit further bases its rendering on depths of the areas as indicated by the depth map.

17. A computing device according to claim 12, wherein the rendering comprises determining a size of text of an annotation such that the size of the text relative to the view changes in accordance with changes in the sizes of the areas relative to the size of the view.

* * * * *